(12) United States Patent
Kuyper-Hammond et al.

(10) Patent No.: US 7,997,491 B2
(45) Date of Patent: Aug. 16, 2011

(54) THIN FILM TRANSISTOR LIQUID CRYSTAL DISPLAY BARCODES

(75) Inventors: Michael Peter Kuyper-Hammond, Kaltbrunn (CH); Michael Charles Osborne, Richterswil (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/228,711

(22) Filed: Aug. 15, 2008

(65) Prior Publication Data
US 2010/0038439 A1  Feb. 18, 2010

(51) Int. Cl.
*G06K 7/14* (2006.01)
(52) U.S. Cl. ...................................................... 235/454
(58) Field of Classification Search .............. 235/462.01–462.49, 454
See application file for complete search history.

(56) References Cited

U.S. PATENT DOCUMENTS

| | | | | |
|---|---|---|---|---|
| 5,900,616 A * | 5/1999 | Takeuchi et al. | ......... | 235/472.01 |
| 6,685,093 B2 * | 2/2004 | Challa et al. | ............. | 235/462.46 |
| 6,749,120 B2 * | 6/2004 | Hung et al. | ............... | 235/472.01 |

* cited by examiner

*Primary Examiner* — Jamara A Franklin
(74) *Attorney, Agent, or Firm* — Scully, Scott, Murphy & Presser, P.C.; Stephen C. Kaufman, Esq.

(57) ABSTRACT

A color-based content encoding system is provided that includes providing a color-containing image from an electronic device display including a fixed pixel grid, wherein the color-containing image includes a plurality of color pixels on the fixed pixel grid, each of the color pixels having sub-pixels correlating to encoded binary data; reading the color-containing image with a scanner; and decoding the encoded binary data. In one embodiment, the plurality of sub-pixels includes three sub-pixels, wherein each sub-pixel of the three sub-pixels corresponds to a binary data value of "1" or "0".

21 Claims, 3 Drawing Sheets

(2 of 3 Drawing Sheet(s) Filed in Color)

| ORDER | 0 | 1 | 2 | 3 | 4 | 5 | 6 | 7 |
|---|---|---|---|---|---|---|---|---|
| VALUE | 0 | 1 | 3 | 2 | 6 | 7 | 5 | 4 |
| SUBPIXELS (RGB) | 000 | 001 | 011 | 010 | 110 | 111 | 101 | 100 |

FIG. 6

THIN FILM TRANSISTOR LIQUID CRYSTAL DISPLAY BARCODES

FIELD OF THE INVENTION

The present invention, in one embodiment, relates to the field of portable computing devices. In one embodiment, the present invention relates to using portable computing devices to exchange information with barcodes composed of color images.

BACKGROUND OF THE INVENTION

Barcodes are used to represent information in a manner that can be easily and automatically read by machines referred to as barcode readers. Accordingly, bar codes are utilized for a variety of different purposes, which range from tracking and identifying inventory items to identifying persons. Barcodes can be implemented as single dimension barcodes or as multi-dimensional barcodes.

In any case, barcode readers, whether implemented as laser scanners, charge-coupled device (CCD) array scanners, or wand scanners, can read a barcode printed on a label. Generally, the barcode reader is able to read the barcode by passing a beam of light over the barcode. The scanner can determine the bars and the spaces between the bars based upon how much light is reflected from the barcode. Notably, barcode readers can scan a given target barcode anywhere from one time per second to over hundreds of times per second. Once the barcode has been read, the bar code scanner can process the raw data.

SUMMARY OF THE INVENTION

In one embodiment, a color based content encoding method is provided that integrates several bits of data into a single pixel of color. Broadly, the color based content encoding method includes providing a color-containing image from an electronic device display including a fixed pixel grid, wherein the color-containing image includes a plurality of color pixels on the fixed pixel grid, each of the color pixels having sub-pixels correlating to encoded binary data; reading the color-containing image with an scanner; and decoding the encoded binary data.

In another aspect, an encoding system is provided that includes an electronic device display having a fixed pixel grid; a color containing image to be displayed on the electronic device display, the color containing image comprised of a plurality of pixels, each of the pixels when displayed on the electronic device display includes a plurality of sub-pixel on the fixed pixel grid, each of the plurality of sub-pixel having a color and positioning on the fixed pixel grid corresponding to a binary encoding; and a scanner for readying the color-containing image from the electronic device display and decoding the binary encoding.

DESCRIPTION OF THE DRAWINGS

The patent or application file contains at least on drawing executed in color. Copies of this patent or patent application publication with color drawing(s) will be provided by the Office upon request and payment of the necessary fee.

The following detailed description, given by way of example and not intended to limit the invention solely thereto, will best be appreciated in conjunction with the accompanying drawings, wherein like reference numerals denote like elements and parts, in which:

FIG. 2A depicts the pixels of a color-containing image that is displayed on a TFT LCD display. FIG. 2B is a display representation of the color sub-pixels of the pixels of the color-containing image that is depicted in FIG. 2A. FIG. 2C is a gray-scale representation of the color sub-pixels of the pixels of the color-containing image that is depicted in FIG. 2B. FIG. 2D is a chart of the binary content that is represented by the pixels and sub-pixels of the color-containing image displayed on the TFT LCD display depicted in FIGS. 2A-2C.

FIG. 6 is a table depicting encoding of a Gray code variation that may be utilized in the encoding of the row counter feature, remaining row counter feature, and the trailing row counter feature of the present invention.

DETAILED DESCRIPTION OF THE INVENTION

Figure 1:
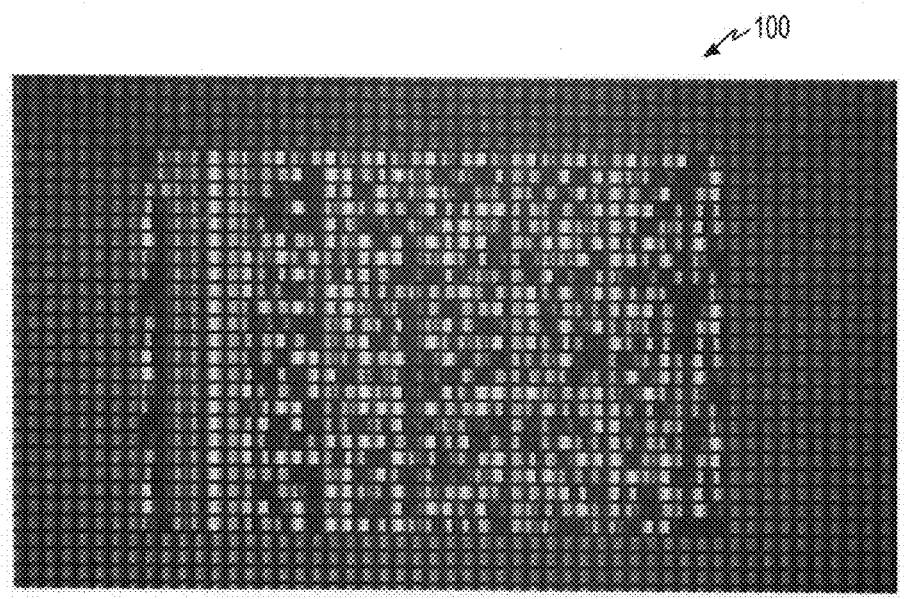
FIG. 1 is a pictorial representation of one example of a color-containing image, i.e., color-containing barcode, as generated for display on a liquid crystal display (LCD) thin film transistor (TFT) display device.

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

The embodiments of the present invention relate to color based encoding methods and systems. When describing the following methods and systems, the following terms have the following meanings, unless otherwise indicated.

For the purposes of this disclosure, a "barcode" is a machine-readable representation of information that is converted into bits of data, such as 1's and 0's.

A "fixed pixel grid" for the purposes of this disclosure is an electronic display made up of a grid of square or rectangular pixels.

The term "scanner" denotes a device including a light source, a lens and a photo conductor translating optical impulses into electrical ones.

"Color" is a visual perceptual property corresponding in humans to the categories called red, yellow, and blue, and shades including the aforementioned categories.

The term "pixel" denotes the smallest piece of information in an image. Pixels may be arranged in a regular 2-dimensional grid, and are often represented using dots or squares.

A "sub-pixel" denotes a single-color region that is a separately addressable element of a pixel.

A "data area" and/or "data payload" is the portion of the color-containing image that contains the data that is to be transmitted by the color image when scanned.

As used herein, a "row counter feature" is a plurality of pixels that provides a repeating count that when scanned generates a set of transitions between rows that corresponds to the binary encoding that provides a relative number of pixel rows.

As used herein, the "remaining row counter feature" is a plurality of pixels that when scanned counts in reverse order than the row counter feature to provide the number of remaining rows that have not been scanned.

The term "trailing row counter feature" denotes a plurality of pixels that when scanned indicates that the color-containing image has been scanned in its entirety and signals termination of the scan.

A "height encoding feature" is a plurality of pixels that when scanned provides the number of pixel rows in the color-containing image, i.e., the gross number of pixel rows.

A "width encoding feature" is a plurality of pixels that when scanned provide the number of pixel columns in the color-containing image.

As used herein, the "column frame feature" is a plurality of pixels that when scanned provides the orientation of color image, i.e., whether the color-containing image is being scanned in a real image orientation or an inverted image orientation.

As used herein the term "guard band" denotes a boarder that separates the color image from unrelated content on the same electronic display.

A color based encoding system is provided which stores several bits of information into a single color pixel by utilizing encoding corresponding to the colors of the sub-pixels for each pixel in a color-containing image, such as a bar-code. In one embodiment, a color based encoding system is provided that is based on the sub-pixel characteristics of electronic displays, e.g., liquid crystal display (LCD) thin film transistor (TFT) displays, that allow information to be recovered by both color and monochrome reading equipment.

In one embodiment, as opposed to methods of encoding that rely upon black and white images, i.e., black and white barcodes, in which the amount of information that may be displayed is dictated by the pixel count of the device display, by integrating binary information into color pixels that are displayed on electronic displays, the present invention may effectively triple or greater than triple the number of pixels for binary data. More specifically, in the embodiments of the invention, in which each color pixel is composed of three sub-pixels, the color encoding for each of the sub-pixels provides for one binary data value for each sub-pixel. Further, in one embodiment, the present invention provides a frame that is particularly fit from reconstruction when scanned from a TFT electronic display, and more generally when scanned from any sub-pixel orientated display.

FIG. 1 is a pictorial representation of a color-containing image 100, i.e., color barcode, as depicted on a liquid crystal display (LCD) thin film transistor (TFT) display. Liquid crystal display (LCD) thin film transistor (TFT) displays represent one example of an electrical display having a fixed pixel grid suitable for displaying a color-containing image 100, in accordance with the present invention.

Figures 2A, 2B, 2C, 2D:
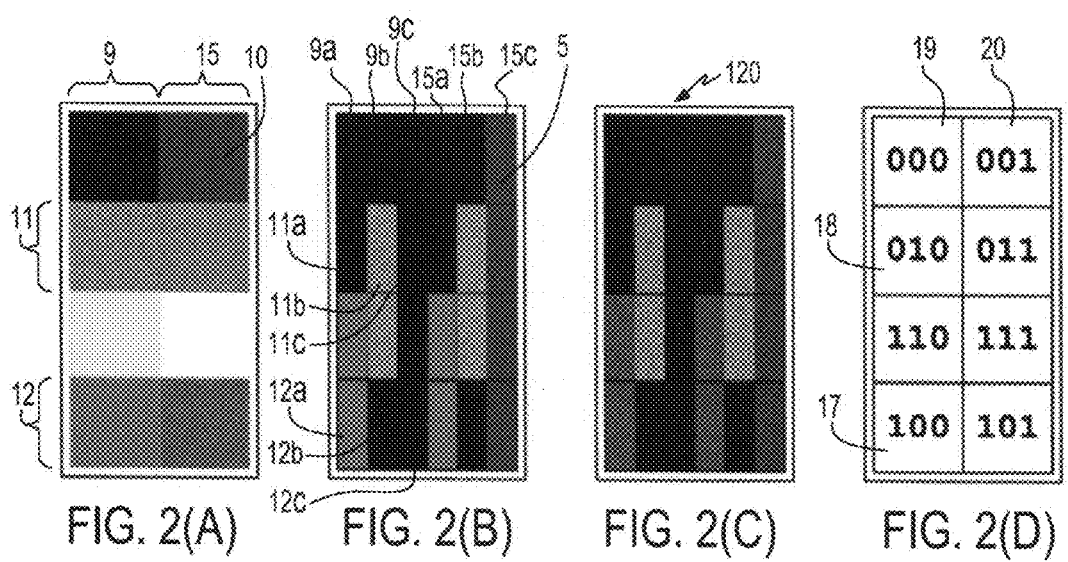
FIGS. 2A-2D are charts illustrating the correlation between the pixels of a color-containing image as displayed on a TFT LCD display and binary content, as used in one embodiment of the encoding system of the present invention.

FIGS. 2(a)-2(d) depict tables of one embodiment of an exemplar color combination and binary representation for the encoding system and method of the present invention. In one embodiment, a pixel 10 of a single color, such as blue (depicted by reference number 15) may correspond to a binary representation of "001" (depicted by reference number 20). Each pixel 10 is comprised of a plurality of sub-pixels 5. In one embodiment, a blue pixel 15 including three sub-pixels 15a, 15b, 15c, corresponds to a binary representation 20 that may include three binary values. For example, a blue color pixel 15 including a first sub-pixel 15a composed of black, a second sub-pixel 15b composed of black, and a third sub-pixel 15c composed of blue, corresponds to a binary representation 20 of "001". A black pixel 9 includes three sub-pixels 9a, 9b, and 9c, wherein each of the sub-pixels 9a, 9b, 9c is black, and corresponds to a binary representation 19 of "000". A green pixel 11 includes three sub-pixels 11a, 11b, 11c, in which sub-pixel 11b is green and the remaining sub-pixels 11a, 11c are black, wherein the sub-pixel color selection and orientation corresponds to a binary representation 18 of "010". A red pixel 12 includes three sub-pixels 12a, 12b, 12c, in which sub-pixel 12a is red and the remaining sub-pixels 12b, 12c are black, wherein the sub-pixel color selection and orientation corresponds to a binary representation 17 of "100". Still referring to FIGS. 2(a)-2(d) it is noted that other color pixels, such as lighter and darker shades of the above-described colors, may be provided by multiple color combinations and orientations in the sub-pixel layout of the electronic display, wherein each of the other color pixels may correspond to a different binary representation. FIG. 2C represents a grey scale representation 120 of what a scanner having only grey scale capabilities would read when scanning a color-containing image from an electronic display having a sub-pixel layout, as depicted in FIG. 2B.

In accordance with the methods and systems disclosed herein, electronic displays, e.g., TFT LCD displays, as programmed to generate/position pixels 10 on a rectangular grid. The grid guidelines may or may not be visible with typical scanner resolutions, e.g. scanner resolutions ranging from about 300 dpi or higher. In one example, the inventive method can determine the underlying grid without directly observing electronic display, e.g., TFT LCD, gridlines.

Each pixel 10 is a sample of an original color-containing image 100, where more samples typically provide a more accurate representation of the original. The intensity of each pixel may be variable. As described above, in color-containing systems each pixel typically has three or four components, such as red, green, and blue, or cyan, magenta, yellow, and black.

In one embodiment, the pixels 10 are configured using additive coloring. For example, the additive coloring may be provided by red, green, and blue sub-pixels 5. In another embodiment, the present encoding system may employ subtractive color models. Subtractive color modules start with pure white as a base and filter out components as paint colors are added.

The sub-pixel 5 layout within a pixel 10 is typically fixed, independent of a pixel 10 position within the electronic display. In one embodiment, the sub-pixels 5 are vertically aligned in a rectangular geometry in each of the pixels 10. In another embodiment, the sub-pixels 5 may be horizontally aligned, wherein horizontal alignment may be provided by a 90 degree rotation of vertically aligned sub-pixels 5 independent of direction. It is noted that no single standard for the relative ordering of the sub-pixels 5 is required to practice the present invention.

It is noted that present encoding system may be applied to display technologies without knowing the specific sub-pixel 5 layout. This represents one advantage over conventional human-interface-oriented encoding methods that need to be tuned for specific display types, i.e., specific sub-pixel orientation or layout. In one embodiment, the present invention provides this function through the use of counters and transitions that are present within the color-containing image 100, which will be described in greater detail below.

Figures 3A, 3B, 3C:
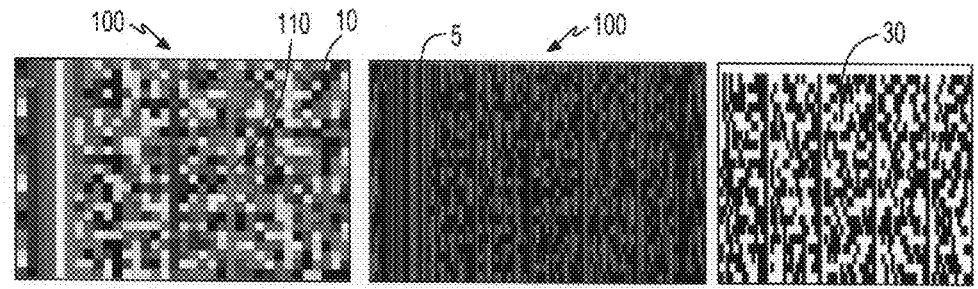
FIG. 3A is a representation of a color-containing image, e.g., color-containing barcode, that is being displayed on a TFT LCD display, in accordance with one embodiment of the present invention.
FIG. 3B is a display representation of the color sub-pixels of the pixels of the color-containing image that is depicted in FIG. 3A.
FIG. 3C is a representation of the color-containing image correlating to the color sub-pixels that are depicted in FIG. 3B.

FIG. 3A is a representation of a color-containing image 100, e.g., color barcode, that is being displayed on a TFT LCD display, wherein the color-containing image 100 includes a plurality of color pixels 10 that provides orientation elements, i.e., counters, and a data area 110 (also referred to as data payload). FIG. 3B is a display representation of the color sub-pixels 5 of the pixels 10 of the color-containing image 100 that is depicted in FIG. 3A. FIG. 3C is a representation of the binary code represented by black pixels corresponding to "1" and no pixels corresponding to "0", wherein the binary code depicted in FIG. 3C correlates to the color sub-pixels 5 that are depicted in FIG. 3B. The binary code that is depicted in FIG. 3C may be referred to as binary data in the form of a two-dimensional monochrome bitmap 30. A monochrome bit map is a representation, including rows and columns of dots, i.e., a plurality of geometric shapes having the same geometry, in which one bit of information represents each dot.

Figure 4:
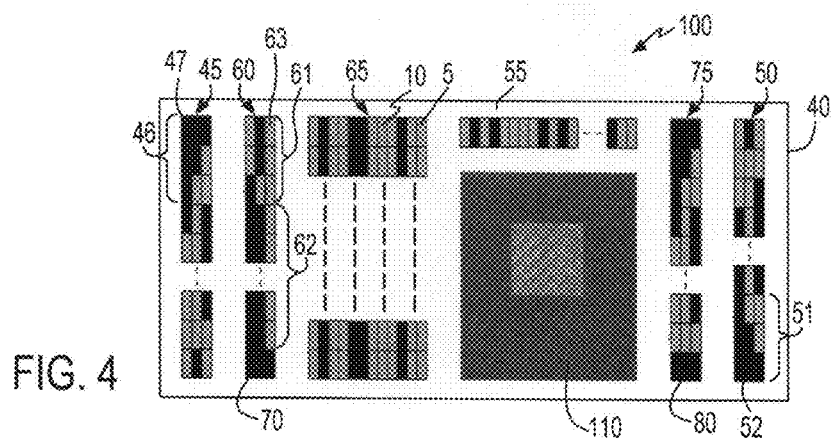
FIG. 4 is a diagram depicting one embodiment of the layout of the sub-pixels of a color-containing image, e.g., color-containing barcode, depicted on a TFT LCD display including a data payload and orientation elements, in which the orientation elements include a row counter feature, a remaining row counting feature, and a column frame feature, in accordance with the present invention.
Figure 5:
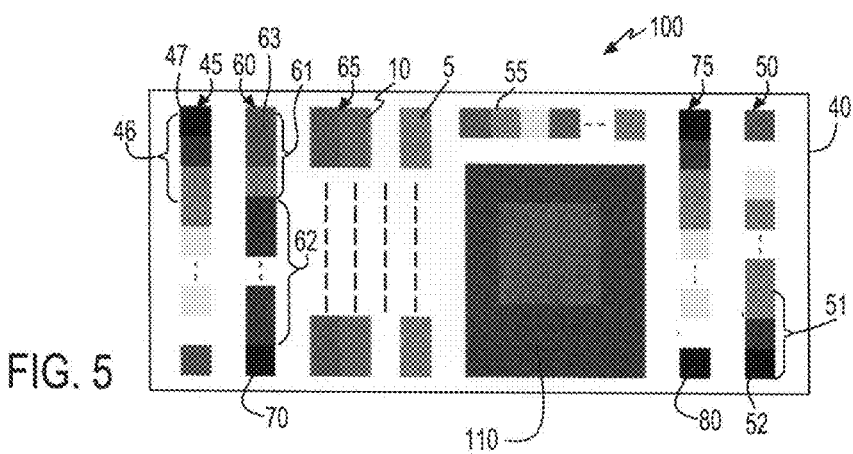
FIG. 5 is a diagram depicting one embodiment of the layout of the pixels of a color-containing image, e.g., color-containing barcode, depicted on a TFT LCD display including a data payload and orientation elements, in which the orientation elements include a row counter feature, a remaining row counting feature, a column frame feature, and a stop column feature, in accordance with the present invention.

In one embodiment, the present color based encoding method and system generates pixel-transition frames, i.e., columns and rows, as depicted in FIGS. 4 and 5, and relies on reconstruction of an underlying pixel grid. Scanners suitable for use with the present color based encoding method and system may have a resolution of 300 dpi or greater. In another embodiment, the scanner has a resolution of 400 dpi or greater. A color scanner may output its reading as R (red), G (green), and B (blue) components, wherein the present encoding method allows for reconstruction with high contrast edges and row counters that can be easily interpreted. A high-resolution grayscale/black and white scanner returns a dense pack of "0" and "1" bits, and may not distinguish between red (R), green (G), and blue (B), wherein software capable of reverse mapping would be used in combination with the high-resolution grayscale/black and white scanner. In one embodiment, the scanner may include decoder circuitry to analyze the image data provided by the photo conductor and for sending the decoded content to the scanner's output. In another embodiment, gray scale scanners may be utilized to read the color-containing images 100 and decode the encoding present therein.

Scanners may synchronize with the color based encoding system using both edge columns and one row, wherein counters, e.g., the remaining row counter, are encoded to dictate transitions at the edge boundaries. Forced transitions in edge rows establish an easily recognizable pattern, which also magnifies pixel boundaries, and allows reliable construction of the pixel grid even from low-quality images.

In one embodiment, the encoding of the present system is based on three element types. The encoding system embeds a data payload 110, e.g., binary data, in a color-containing image 100 and extends it with orientation elements that provide the location of the data payload 110 within the color-containing image 100.

Referring to FIGS. 4 and 5, the orientation elements may include a guard band feature 40 that is surrounding the color-containing image 100, a row counter feature 45, and a remaining row counter feature 50. In one embodiment, the guard band feature 40 is composed of at least one single-pixel-wide band continuously surrounding the color-containing image 100 that separates the color-containing image 100, i.e., barcode, from the unrelated content on the same surface, i.e., on the same electronic display.

Following the determination of the location of the data payload 110, control elements synchronize the data extraction. In one embodiment, the control elements include the row counter feature 45, the remaining row counter feature 50, and a column frame feature 55.

Referring to FIGS. 4 and 5, in one embodiment, the row counter feature 45 is present in a column of pixels in the leftmost corner of the color-containing image 100, i.e., barcode. The row counter feature 45 may indicate the row number (N) using a count that increases from a value starting at "0". In one embodiment, the row counter feature 45 is a three bit counter that encodes on "N modulo 8", i.e., the least significant bits of the row counter. Typically, the encoding is ambiguous in the sense that, for example, "8" and "0" would all map to all-dark, i.e., black sub-pixels. It is noted that in at least one embodiment this type of encoding is also applied to the other counters of the color-containing image 100. In one embodiment, the function of the row counter feature 45 is to generate a set of transitions between rows that corresponds to binary encoding, which allows the scanner to correlate sub-pixel layout with binary code. The count is encoded in the color transitions between adjacent rows of the sub-pixels 5 in the row counter feature 45, which are read and decoded when scanned with a scanner, wherein the scanner may include a decoder. The row counter feature 45 may use a Gray-code variant that changes the color of one sub-pixel 5, e.g., red, green, blue and black, for each row transition, i.e., transition from a first row to an adjacent second row. Gray coding means that with each change in color, e.g. changes in color between red, green, blue and black sub-pixels 5, there is a corresponding change in binary data entry, i.e., a change of one bit of the word code. In one embodiment, the top three vertically aligned pixels 46 of the row counter feature 45 allows for unambiguous recognition of both image magnification and sub-pixel 5 layout. In one embodiment, the first pixel 47 of the row counter feature 45 is black, which provides contrast from the other pixels in the color-containing image 100. By providing a first pixel 47 being distinguishable from the remaining pixels of the color-containing image 100, the row counter feature 45 provides automatic recognition of the location of the at least one corner, e.g., left upper corner, of the color-containing image 100. In one example, the first two pixel transitions within the row counter change two sub-pixels each, due in part to the Gray code variant being utilized. When scanning these two pixels, the scanner can recognize how the sub-pixels are being laid out.

The second pixel column of the color-containing image 100 may provide the height encoding feature 60 that encodes the gross number of rows of the color-containing image 100, and hence encodes the color-containing image height. In one embodiment, the height encoding feature 60 contains a multi-pixel bignumber encoding that is laid out from the top of the column of pixels that provides the height encoding feature 60 to the bottom of the column that provides the height encoding feature 60. The base 4 encoded multi-pixel bignumber may be equal to the gross number of pixel rows and may further include an additional framing row. The multi-pixel bignumber is a self delimiting encoding that contains base-4 digits, in which the highest order bit indicates that further digits will follow. In one example, multi-pixel bignumber encoding maps numbers "0", "1", "2", and "3" to themselves as single digits. Longer numbers include a number of digits with only the least significant being under "4". For example, a color-containing image 100 having 23 rows, as depicted in FIG. 3(a), may be encoded using multi-pixel bignumber (base-4 encoding) as (5,5,3), in which due to the base-4 encoding, decomposition of value "23" is equal to: $23=113_4=16+4+3$ (wherein 4 is added to the first two digits to indicate subsequent ones). In one embodiment, the gross number of rows of the color-containing image 100 is encoded in the first three pixels 61 of the height encoding feature 60. In one embodiment, a self-delimiting function of the height encoding feature 60 is provided by a terminating pixel 70, such as a black terminating pixel 70. The black terminating pixel 70 is positioned at the bottom of the column of pixels that provides the height encoding feature 60, and when scanned indicates the end of the height encoding feature 60. Present between the upper pixels of the height encoding feature 60 that provides the encoding for the gross number of rows of the color-containing image 100, e.g. the first three pixels 61, and the terminating pixel 70 is at least one padding pixel 62. A padding pixel 62 is composed of a color corresponding to a binary expression that does not transmit data, but at the same time does not terminate the scan until the scan reads the terminating pixel 70.

Still referring to FIGS. 4 and 5, moving from left to right, following the height encoding feature 60 are a series of pixel columns that provide a width encoding feature 65 that encodes the number of data payload sub-pixels as a multi-pixel bignumber. It is noted that any number of pixel columns may be utilized to provide the function of width encoding. In one embodiment, the width encoding is self-delimiting and unambiguously decodable. The row count may include an additional row to accommodate the column frame feature 55, which will be described in greater detail below.

In one embodiment, once the width encoding feature 65 has been parsed, the overall dimensions of the color-containing image 100 can be determined. For example, following width encoding, one may verify proper placement of the bottom left corner. In one embodiment, the bottom left pixel of the column of height encoding pixels 60 provides a bottom indicator, i.e., terminating pixel 70, which may be black by construction. It is noted that each of the columns of pixels that provide the width encoding feature 65 span from an upper border of the color-containing image 100 to the lower surface of the color-containing image 100.

In one embodiment, a single pixel row, added over the data payload 110 contains the column frame feature 55. The column frame feature 55 may include a high frequency sub-pixel pattern. In one example, the high frequency sub-pixel pattern is provided by a dark sub-pixel rotating its position amongst lighter colored sub-pixels of a single pixel, e.g., a single dark sub-pixel rotating around three sub-pixels. The column frame feature 55 may be used to verify horizontal synchronization of the color-containing image 100. It is noted that prior barcode images typically contain sufficient data variation to synchronize scanning equipment. In one embodiment, the present invention includes a column frame feature 55 that facilitates decoding of images without such variation, such as those with identical pixels.

Still referring to FIGS. 4 and 5, the data payload 110 is typically written in a rectangular area underlying the column frame feature 55. In one embodiment, the data payload 110 contains a packed version of the input pixel grid. More specifically, in one embodiment, the input is right-padded with zeroes to an integer multiple of three pixels. The padded image may be separated into column groups of 3 pixels each. In one embodiment, each column group is mapped into a single color pixel column, using the encoding described in reference to FIGS. 2(a)-2(d).

In one embodiment, a further orientation/control element is the trailing row counter feature 75, which is positioned in the second pixel column from the right. The trailing-row counter feature 75 when scanned indicates that the scan has reached the bottom row corner of the color-containing image 100, which indicates termination of the scan. In one example, the trailing row counter feature 75 repeats the color pixel sequence of the row counter feature 45, with the exception that the bottom pixel 80 is black (hereafter referred to as the black terminating pixel 80). In one embodiment, repetition of the row counter feature 45 in the trailing row counter feature 75 facilitates grid reconstruction. In one embodiment, the trailing row counter feature 75 may also function as a stop column that may verify that the data pixels have been scanned properly. The application of a black terminating pixel feature 80 as the last pixel in the pixel column of the trailing row counter 75 may provide detection for the scanner of the proper termination for the color-containing image 100.

Still referring to FIGS. 4 and 5, the rightmost pixel column is the remaining row counter feature 50, which encodes the number of remaining rows. The remaining row counter feature 50 counts down to 0 utilizing the symbol set that may be shared with the row counter feature 45. In one embodiment, when the height encoding feature 60 has been decoded, the scanner can verify that the row counter feature 45 has started properly, and can therefore reject improperly scanned images just based on the first few pixels. In one embodiment, the row counter feature 45 and the remaining row counter feature 50 are mirror images of each other by construction. In one embodiment, the final three pixels 51 of the remaining row counter feature 50, similar to the first three pixels 46 of the row counter feature 45, are orientation elements that aid in providing the location of the color-containing image 100, and the data area 110 of the color-containing image 100. When scanned, the remaining row counter feature 50 can verify that the height encoding feature 75 also contains a terminating black pixel 80. In one embodiment, the trailing row counter feature 75 and the remaining row counter 50 must include a final pixel 80, 52 that is black in order to signal for termination of the scan.

In one embodiment, all of the counters, i.e, the row counter feature 45, the remaining row counting feature 50, the trailing row counting feature 75, the height encoding feature 60, and the width encoding feature 65, use the encoding that is similar to the sub-pixel 5 combinations depicted in FIGS. 2(a)-2(d). The row counter feature 45, the trailing row counting feature 75 and the remaining row counter feature 50 may use a Gray code variant that provides a single sub-pixel change with every transition. In one embodiment, the Gray code variant may guarantee exactly one sub-pixel change between any two consecutive values, wherein the encoding cycles through color combinations, as depicted in FIG. 6. FIG. 6 depicts one example of how counting from 0 to 7 may be encoded and mapped to specific colors.

Referring back to FIGS. 4 and 5, in addition to the information that is encoded in the individual framing fields (orientation elements), i.e., the counters, the framing fields may also interact to allow for convenient secondary cross-checking between themselves in determining the orientation of the color-containing image 100 during scanning. For example, the first pixel 46 of the row counter feature 45 and the last pixel 52 of the remaining row counter feature 50 may both be black to provide high contrast corners, in which the high contrast corners facilitate locating of the perimeter that encompasses the color-containing image 100. Further, the row counter feature 45 and the remaining row counter feature 50 are mirror images by construction, in which the synchronized color transitions in these features provides for reconstruction of the underlying fixed pixel grid upon scanning. Additionally, scanning the height encoding feature 60 and the trailing row counter feature 80 indicates whether the color-containing image 100 is real, i.e., right side up, or inverted, i.e., upside down. For example, in one embodiment, a real color-containing image 100 is being scanned when the leftmost upper pixels in the upper row contain a black pixel, e.g., the first pixel 47 of the row counter feature 45, and a color-containing (non-black) pixel, e.g., the first pixel 63 of the height encoding feature 61, and the right most upper pixels in the lower row are both black, i.e., the last pixel 80 of the trailing row counter feature 75 and the last pixel 52 of the remaining row counter feature 50.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded into a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture, which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:
1. A color based content encoding method comprising:
providing a color-containing image from an electronic device display comprising a fixed pixel grid, wherein the color-containing image comprises a plurality of color pixels on the fixed pixel grid, each of the color pixels have sub-pixels, wherein each of the sub-pixels correlate to encoded binary data;
reading the sub-pixels of the color-containing image with a scanner; and
decoding the encoded binary data from the sub-pixels of the color-containing image, wherein each of the sub-pixels encodes a single data bit.

2. The encoding method of claim 1, wherein the electronic device display comprises a thin film transistor liquid crystal display.

3. The encoding method of claim 1, wherein the plurality of sub-pixels comprises three sub-pixels per pixel.

4. The encoding method of claim 3, wherein each sub-pixel of the three sub-pixels corresponds to a binary data value of "1" or "0".

5. The encoding method of claim 4, wherein each sub-pixel is of a red, green, or blue color, or the sub-pixel is black.

6. The encoding method of claim 4, wherein each sub-pixel is of a cyan, magenta, or yellow, or the sub-pixel is black.

7. The encoding method of claim 1, wherein the optical scanner has a resolution of about 300 dpi or higher.

8. The encoding method of claim 1, wherein the scanner is a gray-scale scanner or is a color scanner.

9. The encoding method of claim 1, wherein the color-containing image is a barcode.

10. The encoding method of claim 1, wherein the color-containing image comprises a data area and a plurality of orientation elements.

11. The encoding method of claim 10, wherein the orientation elements comprise a row counter feature, a height encoding feature, a width encoding feature, a trailing row counter feature, and a remaining row counter feature.

12. The encoding method of claim 11, wherein each of the row counter feature, the height encoding feature, the width encoding feature, the trailing row counter feature and the remaining row counter feature include at least one column of pixels.

13. The encoding method of claim 11, wherein the row counting feature generates a series of transitions in colors of the sub-pixels from a first row to a second adjacent row, wherein when scanned correlates sub-pixel layout with binary code.

14. The encoding method of claim 13, wherein a gross number of rows in the color-containing image is encoded in the height-encoding feature.

15. The encoding method of claim 14, wherein the height encoding feature includes a terminating pixel at an end of the column of pixels that provides the height encoding feature.

16. The encoding method of claim 11, further comprising a frame counter feature present in a row of pixels overlying the data area, wherein the frame counter feature comprises a sub-pixel pattern that facilitates data extraction from the data area.

17. An encoding system comprising:
an electronic device display having a fixed pixel grid;
process device for generating a color-containing image to be displayed on the electronic device display, the color containing image comprised of a plurality of pixels, each of the plurality of pixels when displayed on the electronic device display includes a plurality of sub-pixels on the fixed pixel grid, each of the plurality of sub-pixels having a color and positioning on the fixed pixel grid corresponding to a binary encoding; and a scanner for readying the color-containing image from the electronic device display and decoding the binary encoding from each of the plurality of sub-pixels, wherein each of the sub-pixels encodes a single data bit.

18. The encoding system of claim 17, wherein each of the plurality of sub-pixels corresponds to a binary data value of "1" or "0".

19. The encoding system of claim 17, wherein the color-containing image comprises a barcode.

20. The encoding system of claim 17, wherein the color-containing image further comprises a row counter feature, a height encoding feature, a width encoding feature, a trailing row counter feature, and a remaining row counter feature.

21. A color based content encoding method comprising:

providing a color-containing image from an electronic device display comprising a fixed pixel grid, wherein the color-containing image comprises a data area and a plurality of orientation elements, the data area comprises a plurality of color pixels on the fixed pixel grid, each of the color pixels having sub-pixels correlating to encoded binary data, the orientation elements comprising a row counter feature, a height encoding feature, a width encoding feature, a trailing row counter feature, a remaining row counter feature or a combination thereof;

reading the color-containing image with a scanner; and decoding the encoded binary data.

* * * * *